United States Patent
Martinez

(10) Patent No.: US 11,330,794 B2
(45) Date of Patent: May 17, 2022

(54) WINDOW MOUNTED PET LITTER HOUSING AND PET SHELTER DEVICE

(71) Applicant: Alden Martinez, Henderson, NV (US)

(72) Inventor: Alden Martinez, Henderson, NV (US)

( * ) Notice: Subject to any disclaimer, the term of this patent is extended or adjusted under 35 U.S.C. 154(b) by 124 days.

(21) Appl. No.: 16/440,734

(22) Filed: Jun. 13, 2019

(65) Prior Publication Data
US 2019/0289815 A1  Sep. 26, 2019

Related U.S. Application Data

(63) Continuation-in-part of application No. 15/068,734, filed on Mar. 14, 2016, now abandoned.

(60) Provisional application No. 62/132,816, filed on Mar. 13, 2015.

(51) Int. Cl.
| | | |
|---|---|---|
| *A01K 1/035* | (2006.01) | |
| *A01K 1/01* | (2006.01) | |
| *A01K 1/03* | (2006.01) | |
| *A01K 1/00* | (2006.01) | |
| *E06B 7/32* | (2006.01) | |

(52) U.S. Cl.
CPC ............ *A01K 1/035* (2013.01); *A01K 1/0064* (2013.01); *A01K 1/0107* (2013.01); *A01K 1/03* (2013.01); *A01K 1/033* (2013.01); *E06B 7/32* (2013.01)

(58) Field of Classification Search
CPC ...... A01K 1/02; A01K 1/0064; A01K 1/0107; E06B 7/32
USPC ................ 119/479, 481.484, 485, 161, 165; D30/161
See application file for complete search history.

(56) References Cited

U.S. PATENT DOCUMENTS

| | | | | |
|---|---|---|---|---|
| 3,918,203 A | * | 11/1975 | Ellison, Jr. ............... | E06B 7/32 49/168 |
| 4,029,048 A | * | 6/1977 | Gershbein ............ | A01K 1/0107 119/165 |
| D264,261 S | * | 5/1982 | Durocher ..................... | D30/161 |
| D317,216 S | * | 5/1991 | Cutrone ........................ | 119/484 |
| 5,167,202 A | * | 12/1992 | Bradford ................ | A01K 1/035 119/452 |
| 5,522,344 A | * | 6/1996 | Demurjian ............. | A01K 1/033 119/474 |
| 5,890,455 A | * | 4/1999 | Donchey ............... | A01K 1/0245 119/484 |
| 7,614,363 B2 | * | 11/2009 | Di Angelo ............ | A01K 1/033 119/28.5 |
| 8,881,680 B1 | * | 11/2014 | Woody ................ | A01K 1/0114 119/165 |

* cited by examiner

*Primary Examiner* — Andrea M Valenti
(74) *Attorney, Agent, or Firm* — Michael L. Greenberg, Esq.; Greenberg & Lieberman, LLC

(57) ABSTRACT

A window-mounted pet litter housing is described. The housing is equipped with at least one door, a front opening, a transparent rear panel, a ceiling, a floor, and at least one window anchor mount. The front opening facilitates access to the housing by the pet. The interior of the housing provides adequate space for the pet litter box, as well as space for the pet to lie down and peer through the transparent rear panel. Vented louvers are disposed in the left wall and right wall which provide ventilation while preventing rain and snow from entering the housing. A mounting plate present in the preferred embodiment expedites and facilitates secure installation of the housing from inside the structure equipped with the window.

5 Claims, 15 Drawing Sheets

WINDOW MOUNTED PET LITTER HOUSING AND PET SHELTER DEVICE

CONTINUITY

This application is a continuation-in-part application of non-provisional application Ser. No. 15/068,734, filed on Mar. 14, 2016, which is of provisional patent application No. 62/132,816, filed on Mar. 13, 2015, and priority is claimed thereto.

FIELD OF THE PRESENT INVENTION

The present invention relates generally to pet litter housings and pet shelters, and more specifically relates to a window mounted housing and litter box for use by pets.

BACKGROUND OF THE PRESENT INVENTION

It is known that indoor animals such as cats, ferrets, chinchillas, dogs, and other small pets are prone to employ a litter box filled with pet litter after being trained to use them to use the bathroom. In such scenarios, at least one litter box is conventionally located on the floor in a user-selected location within the home or other structure. Unfortunately, once the litter box has become soiled, there is little the homeowner can do to prevent the creation of odor.

While odor-eliminating sprays can be helpful to temporarily curve the odor, the smell will inevitably return as the pet subsequently uses the litter box. A variety of litter box housings have been invented in an attempt to curb the odor conventionally found with commonly placed litter box set-ups. In fact, numerous other types of pet litter housings and shelters have been invented in the past. One problem encountered with these designs is that the owner generally does not have access to the housing from the inside of the dwelling. For example, in U.S. Pat. No. 5,165,366, granted to Harvey, one can access the litter box for emptying from outside of the housing, on the ground floor only. Another problem is that the litter housings and shelters have to be mounted on the exterior of the dwelling, which makes installation effectively impossible, unless the dwelling is on the ground floor, which is uncommon in cities with high-rise buildings.

In contrast, the pet housing of the present invention may fit into any window, vertical or horizontal as well, and is installed from the inside of the dwelling which can be done from any floor, from the ground floor to high rise buildings. Furthermore, the present invention differs from Harvey's design, in which the litter tray may only be emptied from the exterior of the dwelling. With the present invention, one may access the litter box from the inside of the dwelling, via a unique door design.

Another comparison is choice of materials. Harvey constructs the entire pet litter housing out of acrylic and metal, not realizing just how hot this will make the inside of the housing in the summer. There is 'practically no shade on the inside of the box, except for the tin roof. This is yet another flaw of Harvey as well, as this too acts as even more of a heat conducting material. This is like putting a cat in a sauna or under a magnifying glass, which is obviously not conducive to the health of the cat and may even discourage the cat from using the housing. Continuing on, Harvey places many open holes to be used for ventilation. This is conducive to air circulation, but when it's very cold out, or raining, those two elements could enter the pet litter housing. Rain can cause the pet litter to become prematurely soiled. Combine this with a completely open floor, and there is basically no protection from the elements.

Similarly, U.S. Pat. No. 5,842,438 granted to Messmer is for a window mounted litterbox. Messmer varies from the present invention in that the landing taught by Messmer is far too small to adequately function as a comfortable access point for a pet. This is in contrast to the present invention, which is equipped with a larger, more ample landing to facilitate access to the housing by a pet.

Additionally, U.S. Pat. No. 7,530,331 granted to Malachowski on May 12, 2009 is for a window-mounted litter enclosure having interior and exterior housing sections. Malachowski is similar to the present invention in that it is window mounted, however Malachowski teaches a housing that can only be accessed for cleaning from the outside. Additionally, Malachowski extends within the dwelling, and therefore is not space-saving, unlike the present invention. Malachowski, like Harvey, can only be installed on the ground floor, from the outside as well.

In addition, none of the other described inventions, or any product of similar design to the present invention exist in either past or present markets. The main idea behind the present invention is to be marketed to the general public for purposes of improving the quality of life. For example, if someone lives in a tiny or relatively small dwelling, space is of the utmost importance. This is relevant to housing in cities and places like New York City, Europe, Russia, Asian countries, and any other situations where housing is often small, cramped, and compacted. It is known that most of the housing in cities exist in mid-rise and high-rise dwellings.

The present invention addresses two of the main issues of small pet ownership in "where to put the litter box," as well as eliminating odor. The present invention is preferably made entirely of high density plastic, with only an acrylic material for the rear window. This allows adequate shade, and does not allow the elements to enter the housing as the housing is sealed and waterproof. The side vents allow air to ventilate the entire box, but due to their downward slope, allow rain to drip off, but not enter the box. The vents are also preferably screened in order to ensure insects do not enter the housing. Harvey's patent is similar to the present invention only in the essence of its use, however, it contains all of the flaws mentioned above.

The present invention not only provides a space saving alternative, but also eliminates the odor problems that occur from pet litter housings being in a confined space, with or without adequate ventilation and windows. Additionally, the housings can be provided in different colors, thereby not only saving space, and eliminating odors, but also adding or blending into the existing decor of any dwelling. As such, it should be understood that the present invention is space-saving, odorless, and safe while effectively containing litter spread while eliminating odors and allowing fresh air into the enclosure. The present invention is also preferably ADA compliant at wheelchair height when installed in a window.

Another feature of the present invention is to serve as a cat haven and resting place. Due to the width of the housing, enough room is allocated to give extra space inside the housing to be used as a resting place for the pet. The present invention may also be used as a window perch by simply removing the litter pan and front door. The rear of the housing is preferably equipped with a clear plastic window allowing sunlight to enter and warm the housing, in addition to allowing the cat the ability to view the outside. This again incorporates new features, as well as all the features that other inventions have done individually.

Attempts have been made to provide an adequate swinging door for access, but none compares with the generous single-door design of one embodiment of the present invention that not only allows the cat access into the housing, but also to the owner to facilitate litter changing and cleaning. This allows the owner to have 100% access to the litter tray in a normal standing position. Great for anyone who has back problems, unable to bend or stoop over, and any other related problems due to poor health. This also includes anyone confined to an ADA compliant wheelchair, to have full and easy access to the interior of the housing. Therefore, the present invention contains many facets within its design related to improving the quality of life.

Another advantage to the present invention's design is that of safety, in many aspects. No longer is the housing sitting on the floor, where someone could trip over it. Also, with the housing design of the present invention, it can fit inside of a housing designed set of burglar bars, as would a normal window air conditioning unit that is installed on the ground floor or above. Therefore, these are all primary reasons why the present invention is the provision for a new and improved pet litter housing and shelter.

Thus, there is a need for a window-mounted pet housing apparatus configured for installation from within a dwelling, rather than solely from the outside, that has adequate ventilation while protecting from the elements year round, in all seasons.

SUMMARY OF THE PRESENT INVENTION

The present invention is a four-sided shelter equipped with two solid walls, a rear window made of a transparent material within a frame, and a sliding panel design that comprises the fourth wall at the front of the apparatus The central hole allows the cat to enter and leave the housing as it pleases.

Another embodiment of the present invention exhibits a vertical housing that also utilizes a sliding front panel door design that is narrower than the horizontal embodiment due to the narrow design of the vertical window. This allows 100% access to the litter pan inside. The entire housing mounts securely into any standard horizontal or vertical window with only a few screws. The extension panel(s) seal the rest of the window up in both the horizontal and vertical applications as needed.

The present invention is preferably made entirely of high-density plastic, with only an acrylic material for the rear window. This allows adequate shade and does not allow the elements to enter the housing. The side vents allow air to ventilate the entire box, but due to their downward slope, allow rain to drip off, but not enter the box, unlike the prior art. Additionally, the vents are screened in order to keep insects out of the housing. The top of the housing of the present invention is preferably sloped to allow rain to drip off easily.

Preferred embodiments of the present invention are equipped with a mounting frame which facilitates installation of the housing while inside of the building. The housing is placed through the window frame, and then is affixed to a mounting frame which is larger than that of the window frame, which ensures that the housing remains firmly in position, removing the danger of the housing ever falling out of the window. Such embodiments are equipped with a landing, a front access door configured to pivot about a hinge within the mounting frame, and a pet access hole disposed centrally within the single door. This preferred embodiment is preferably available in a vertically oriented embodiment and a horizontally oriented embodiment, and may be installed vertically or horizontally according to the shape of the window to which it is installed.

BRIEF DESCRIPTION OF THE DRAWINGS

The present invention will be better understood with reference to the appended drawing sheets, wherein.

DETAILED DESCRIPTION OF THE PREFERRED EMBODIMENT

Figure 1:
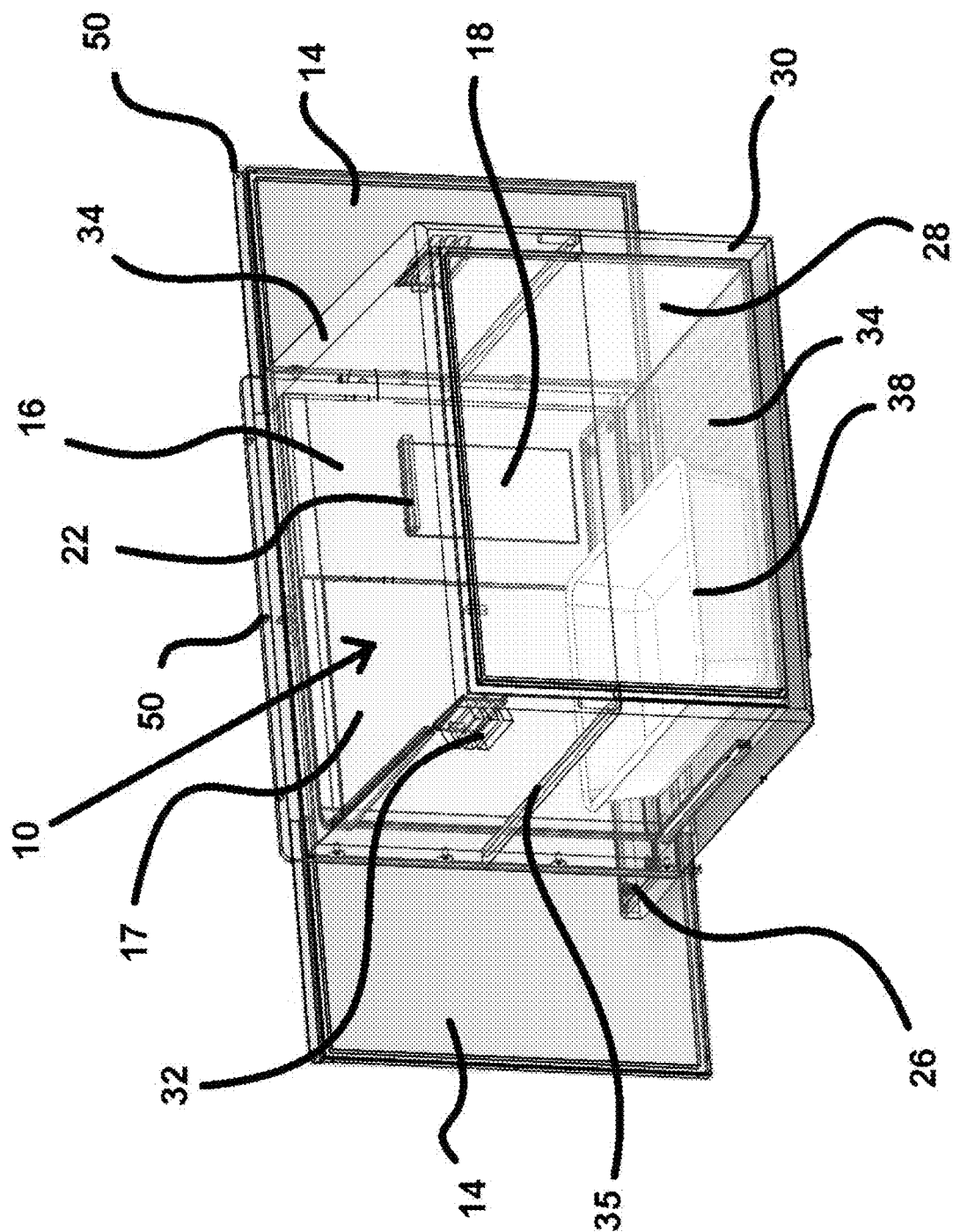
FIG. 1 is an isometric rear view of a first embodiment of the present invention, illustrating the three-door design and housing.

The present invention is a pet litter housing and pet shelter configured for use by pets living within a dwelling such as a home, apartment, condo, high-rise, townhouse, or other similar dwelling. A first embodiment of the present invention is equipped with a housing (10), which consists of side panels (35), a roof (33), a floor (34), a left front door (16) and a right front door (17). The left front door (16) and right front door (17) comprise the front of the housing (10). A flap door (18) is disposed on said left front door (16).

In contrast, a second (primary, preferred) embodiment of the present invention, shown in FIGS. 10-13 and 15, includes a front access door (70), a front central hole (80), a mounting frame (90), and an extension panel (45). At least one handle (75) is present on the front access door (70) of the second embodiment to facilitate opening of the front access door (70) when cleaning is required. The front access door (70) preferably opens to the left about a single hinge

Figure 11:
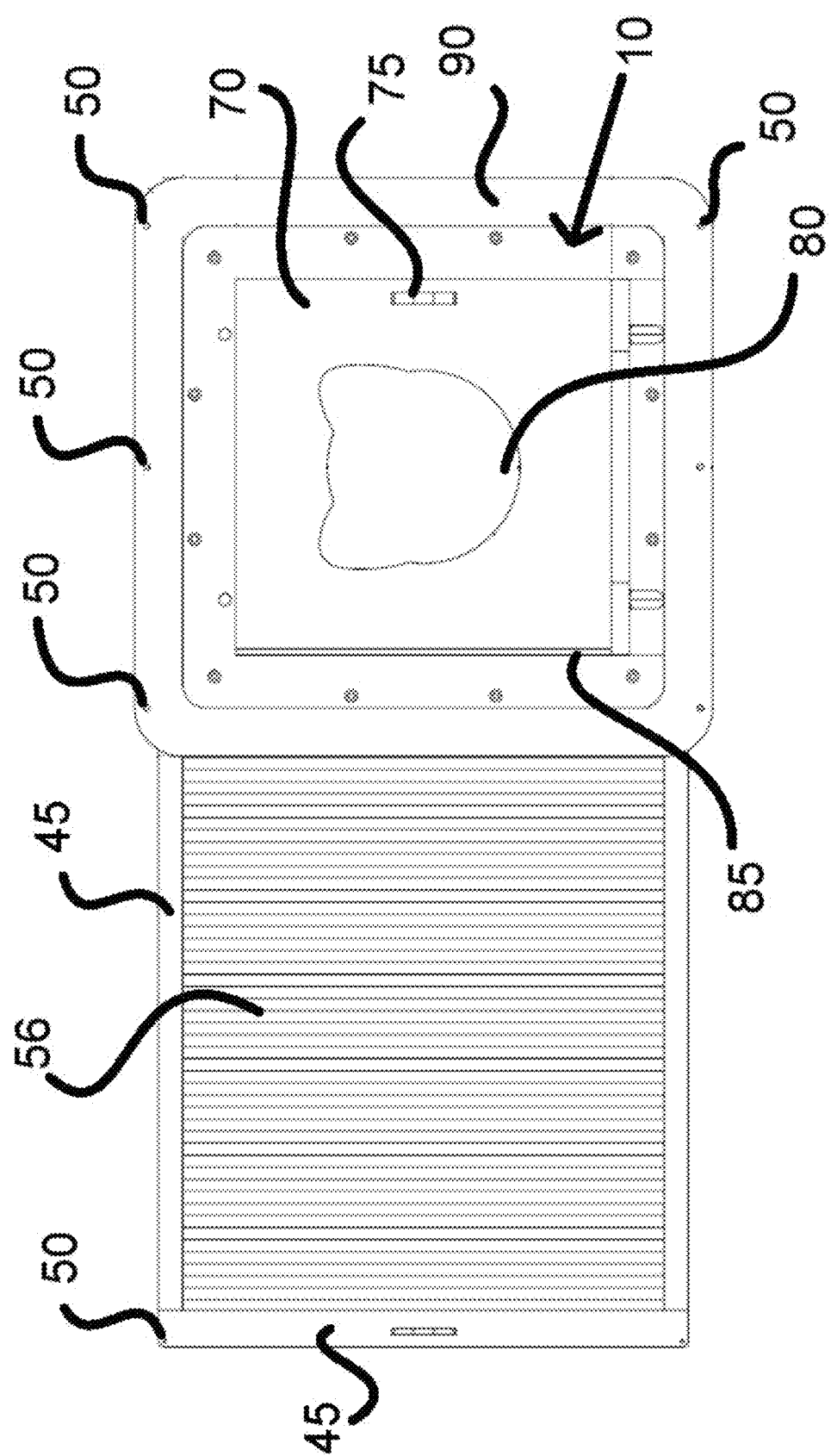
FIG. 11 shows a view of the front of the preferred embodiment of the present invention.

(85) as shown in FIG. 11. The mounting frame (90) is the most critical difference between the preferred embodiment and the first embodiment, as it makes installation even easier and more secure while keeping manufacturing costs lower.

FIG. 1 is a rear exterior view of the first embodiment of the present invention that illustrates the housing (10) assembled for use on any standard-sized horizontally mounted window. The housing (10) itself is similar to an air conditioning window unit, and is preferably inserted into an open window in a similar way. Once placed into a window (12) and secured in position with the provided screws placed into mounting holes (50), the expandable extension panel(s) (14) may be extended (or installed) to close in any gap left between the housing (10) and the window frame.

Per the first embodiment, once the entire housing (10) is fully installed, one can see how the front panel, consisting of the left door (16) and the right door (17), allows one to access the inside of the housing (10) for cleaning. The left front door (16) is equipped with at least one hinge (20) disposed on the left side, so that the left front door (16) opens out, away from the housing (10) when opened. The hinge (20) is preferably disposed at the top and the bottom of the left front door (16) and the right front door (17). The left front door (16) is preferably equipped with the flap door (18) which itself can be removed from its top mounted horizontal hinges (22) as well. At least one conventional magnetic latch is preferably employed to help to keep the left front door (16) and right front door (17) closed. The left front door (16) and the right front door (17) meet together when closed, offset near the center of the housing, and are configured to snap closed via the magnetic latch. Each embodiment of the present invention is also preferably equipped with a landing (26) for the cat to jump on to for entry and exit to and from the housing (10) via the front hole (80) (in the preferred embodiment), or via the flap door (18) in other embodiments. The landing (26) is preferably eight inches deep to provide ample space for the cat. It can also be used as a resting place, or as a secured scratching post as well. As such, the landing (26) is equipped with replaceable carpet or a similar scratching material to aid the pet's grip, and act as a scratching post.

FIG. 1 exhibits a view of the exterior of the housing (10) of the first embodiment of the present invention. The transparent rear panel (28) of the housing (10) is made of a transparent plastic material such as acrylic, Lexan®, plexiglass, etc., and is preferably set into a double reinforced frame (30) for both security and stability. The transparent real panel (28) allows the cat to see outside, and the housing (10) itself is large enough for the cat to lie in as well. The strong exterior of the housing (10) is not only weather resistant, but is also durable to withstand years of sun, rain, cold, snow, etc. The side panels (35) of the housing (10) are equipped with vented louvers (32) to allow airflow throughout the entire housing (10). The vents (32) allow the housing (10) to continually remove waste odors. The vents (32) also keep the odors from traveling into the house as well. Other embodiments may simply have vent holes, which may be plugged manually in the event of rain or cold weather.

Figure 2:
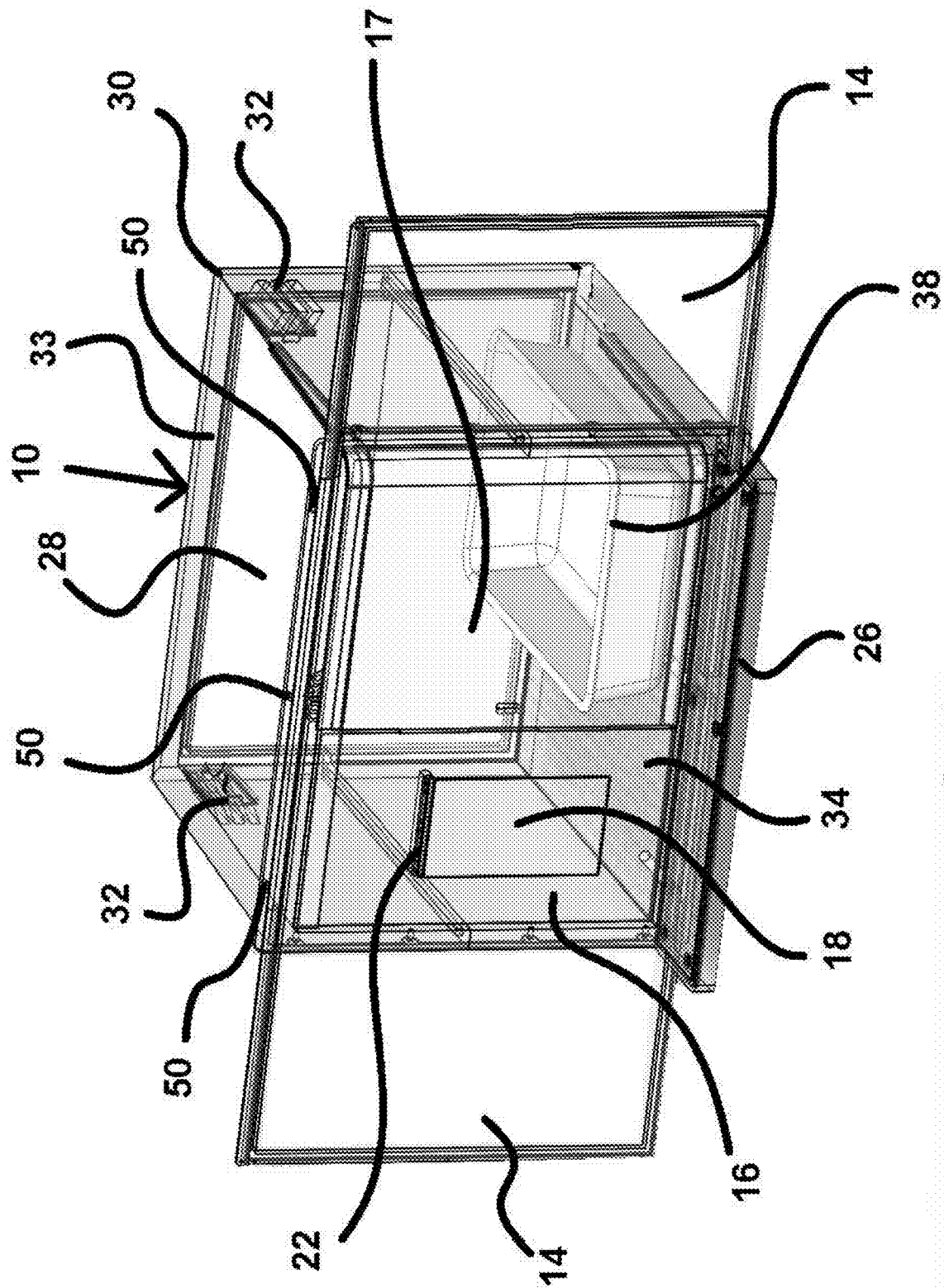
FIG. 2 is an isometric front view of the first embodiment of the present invention, illustrating the three-door design and the landing.
Figure 3:
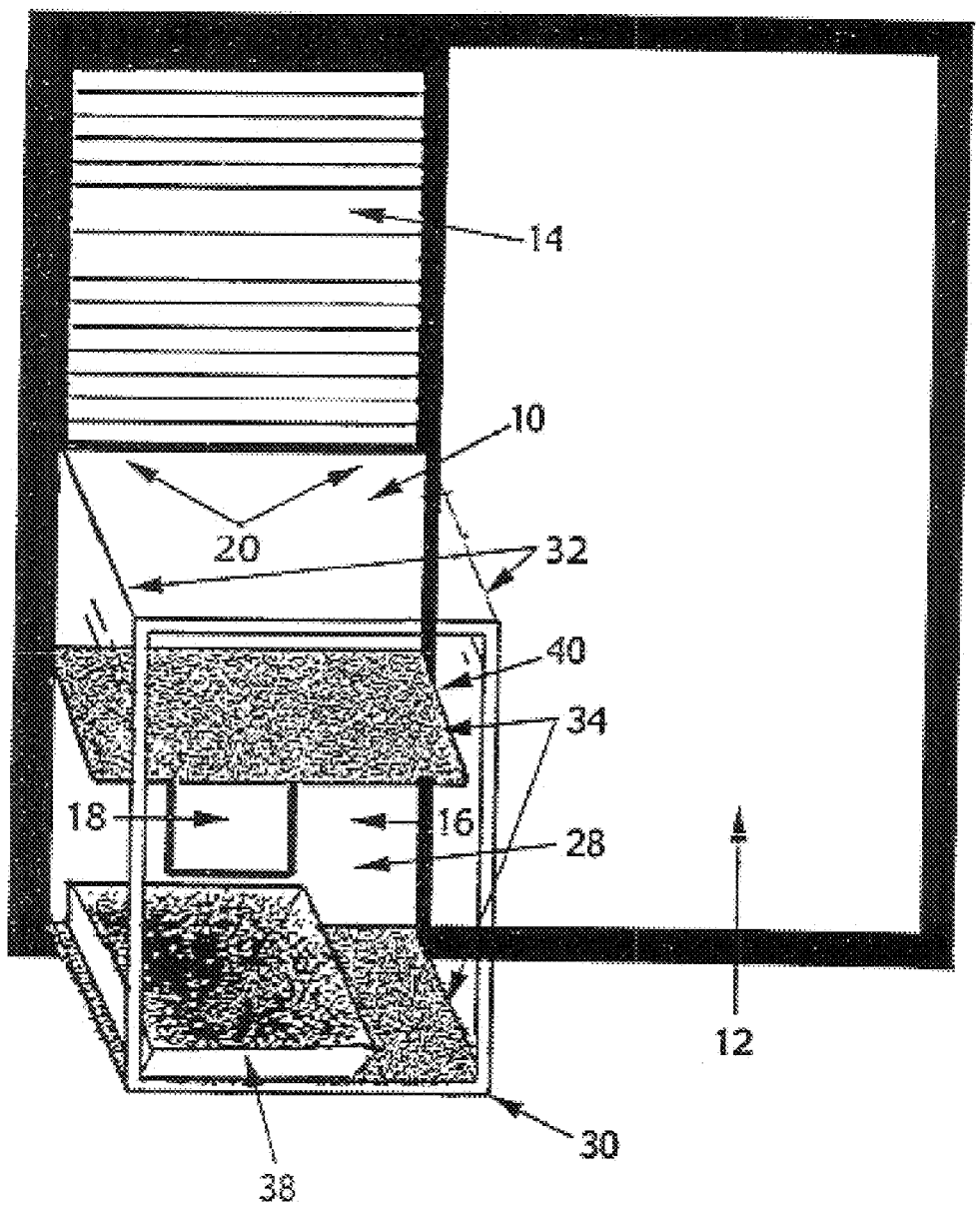
FIG. 3 an isometric exterior rear view of the first embodiment of the present invention, illustrating how the housing mounts into a vertically-oriented window, slider, or casement, and how it varies slightly from FIG. 1.

FIG. 3 exhibits a rear view of the first embodiment of the present invention and shows the housing (10) assembled and installed into a standard-sized slider or casement window. The main housing (10) itself is similar to a vertically mounted window air conditioning unit, and is installed the similar way a window-mounted air conditioning unit would be. Once placed into a window (12) and mounted with the provided screws secured through anchor screw mounts (50) as shown in FIG. 1 and FIG. 2, the expandable extension panel (14) is to be extended to close the gap between the housing (10) and the window frame. The expandable extension panels (14) are preferably equipped with anchor screw mounts (50) as well. Once the entire housing (10) is fully installed, the left front door (16) and right front door (17) may be opened to allow the owner to access the inside. The front door (16) of the first embodiment is equipped with hinges (20) on the top side so that it opens away from the housing (10). The front door (16) also houses the flap door (18) which itself can be removed from its top mounted horizontal hinges (22) as well.

Figure 4:
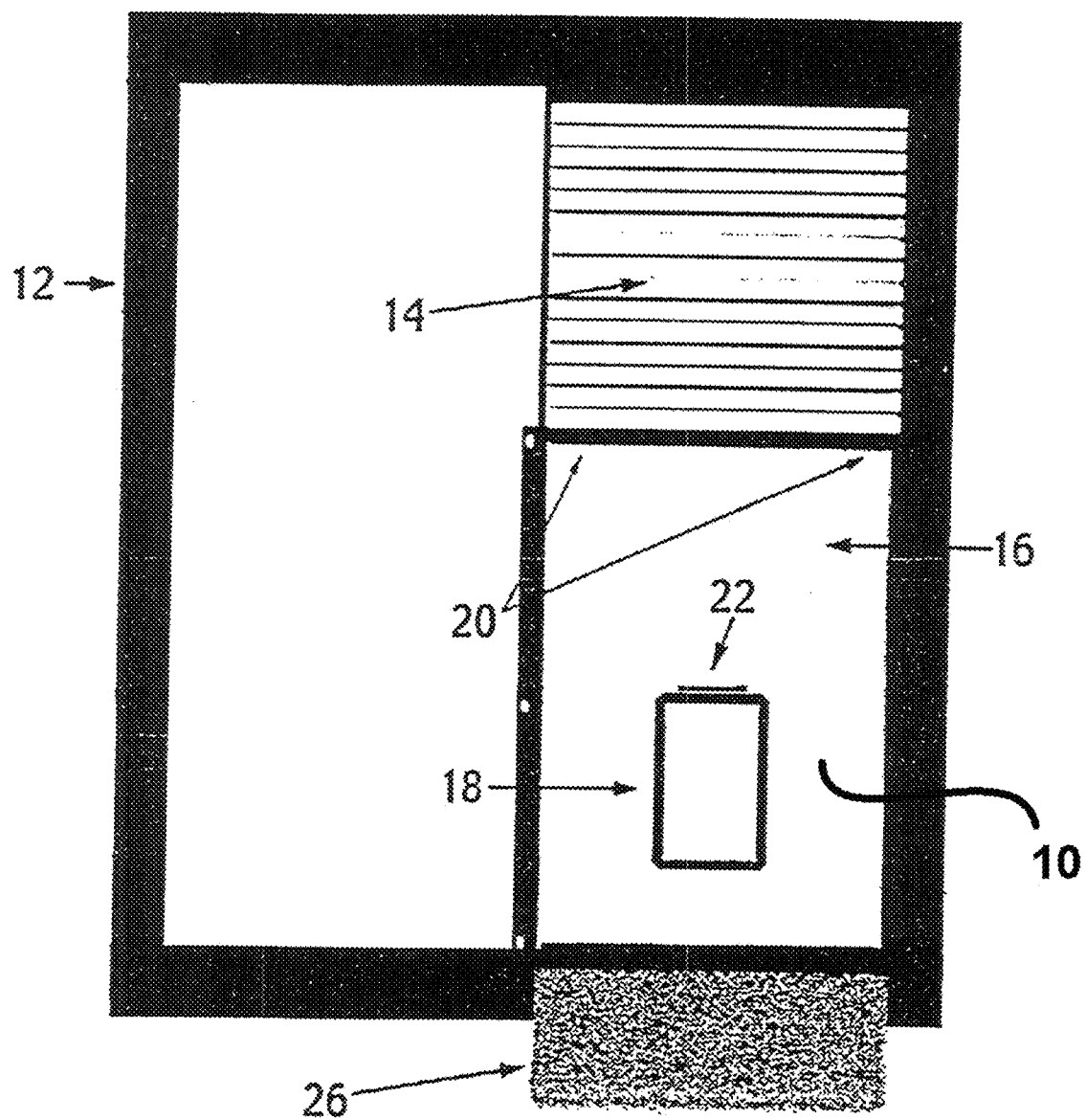
FIG. 4 is a front interior view of a first vertical window embodiment of the present invention, illustrating how the housing sits in a vertically-oriented window.
Figure 5:
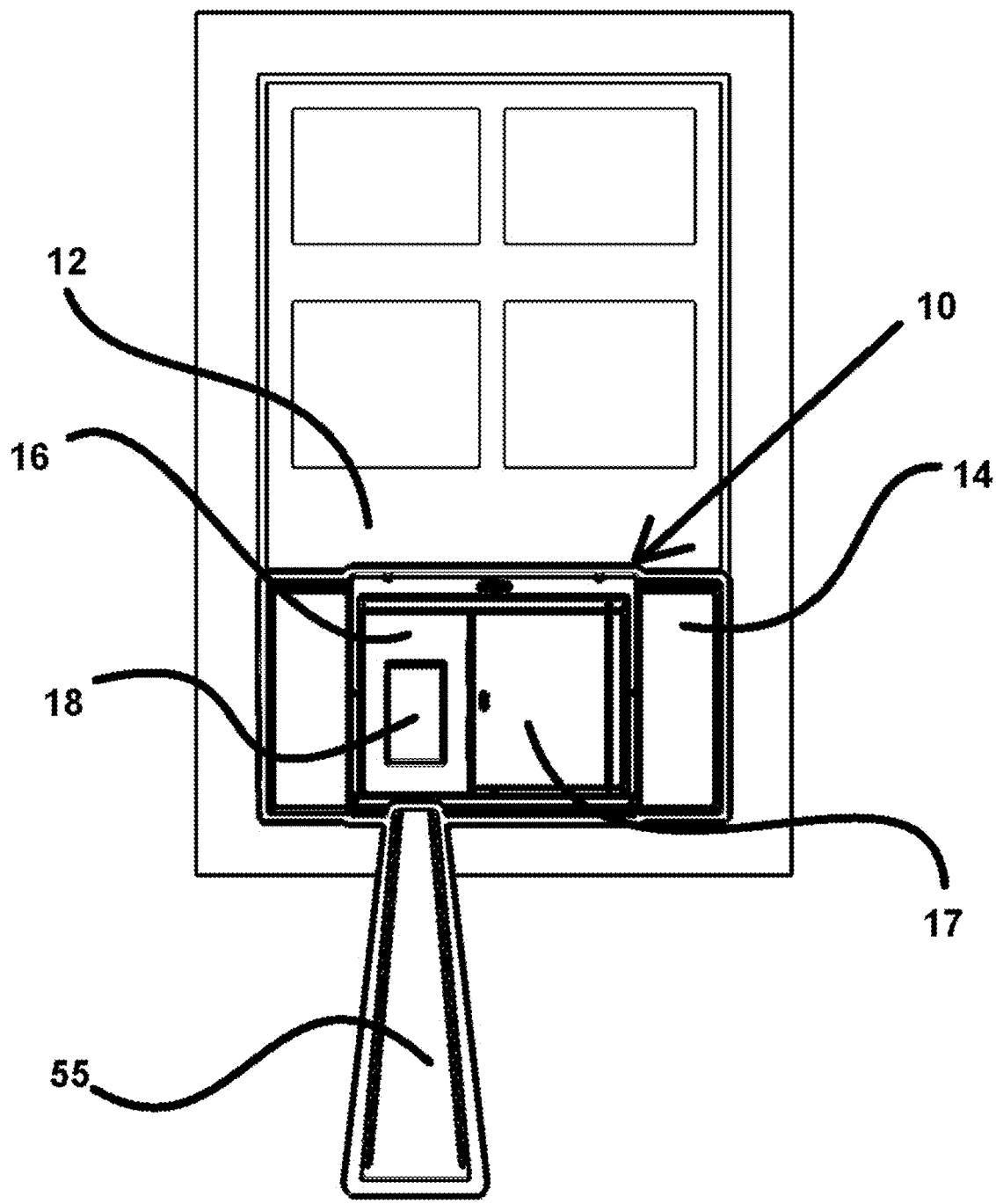
FIG. 5 exhibits a view of the first embodiment of the present invention from the front, equipped with the ramp.
Figure 6:
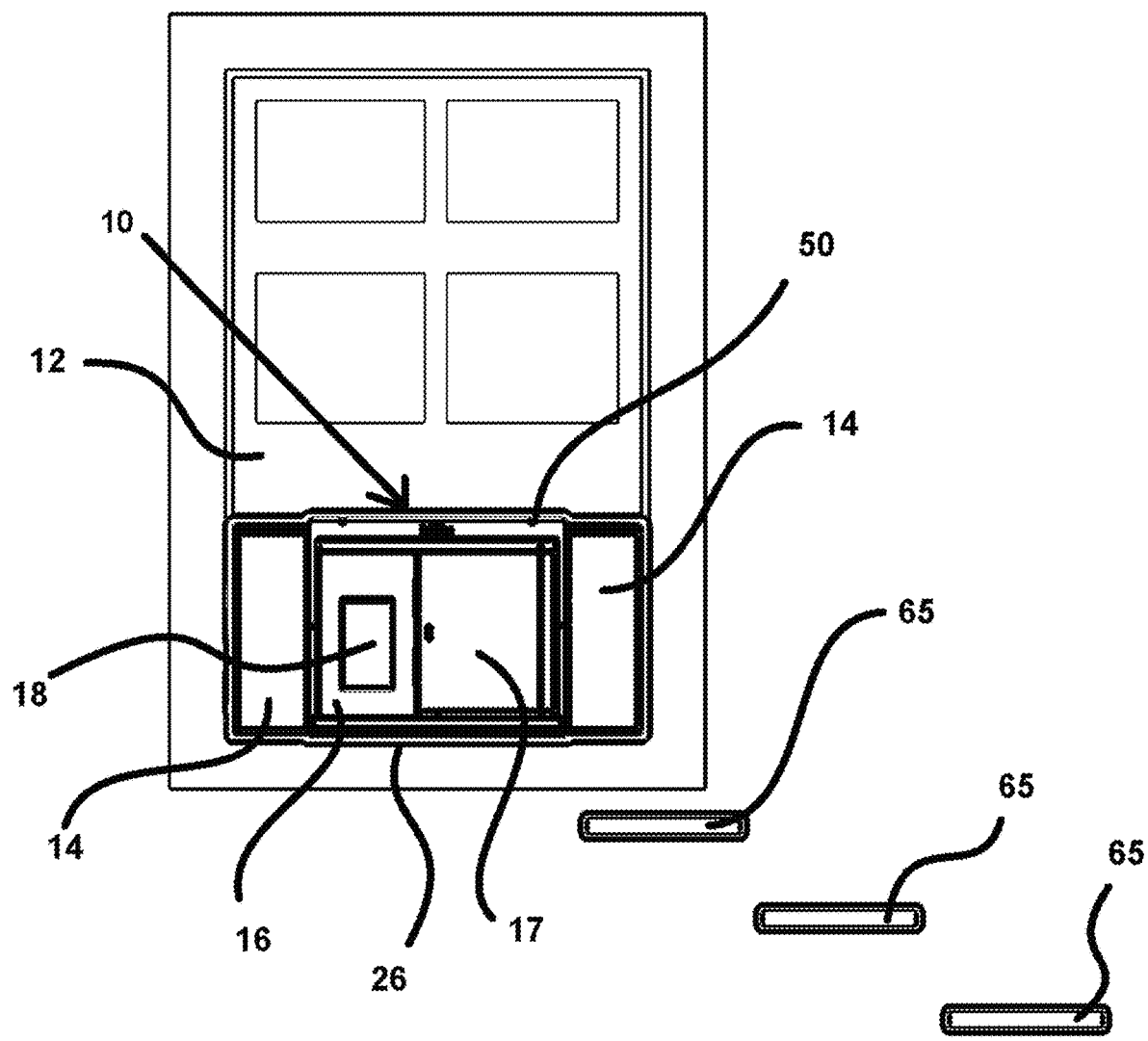
FIG. 6 displays a view of the front of the first embodiment of the present invention, shown equipped with access steps.
Figure 7:
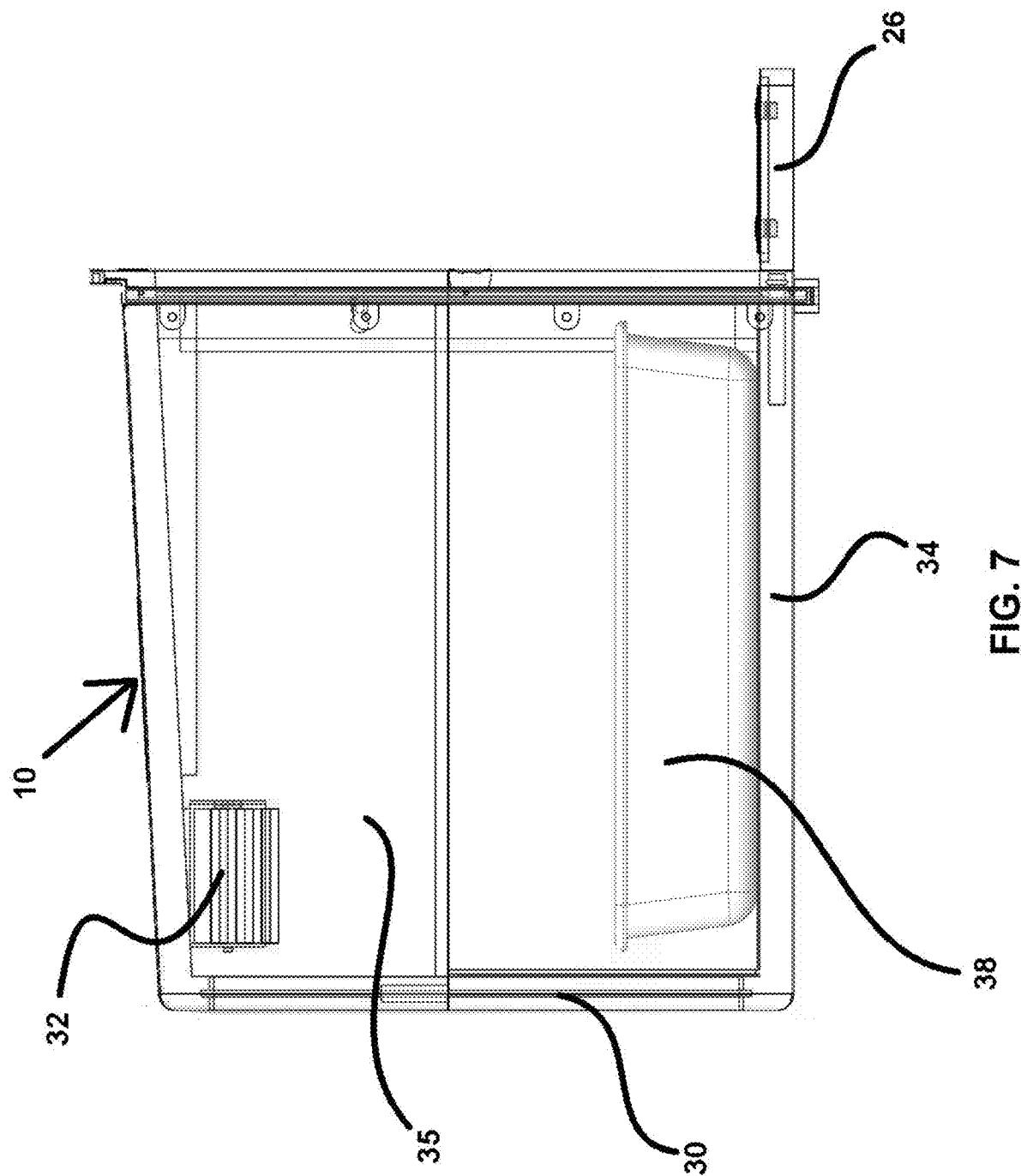
FIG. 7 displays a cross-sectional view of the first embodiment of the present invention from the left side.
Figure 8:
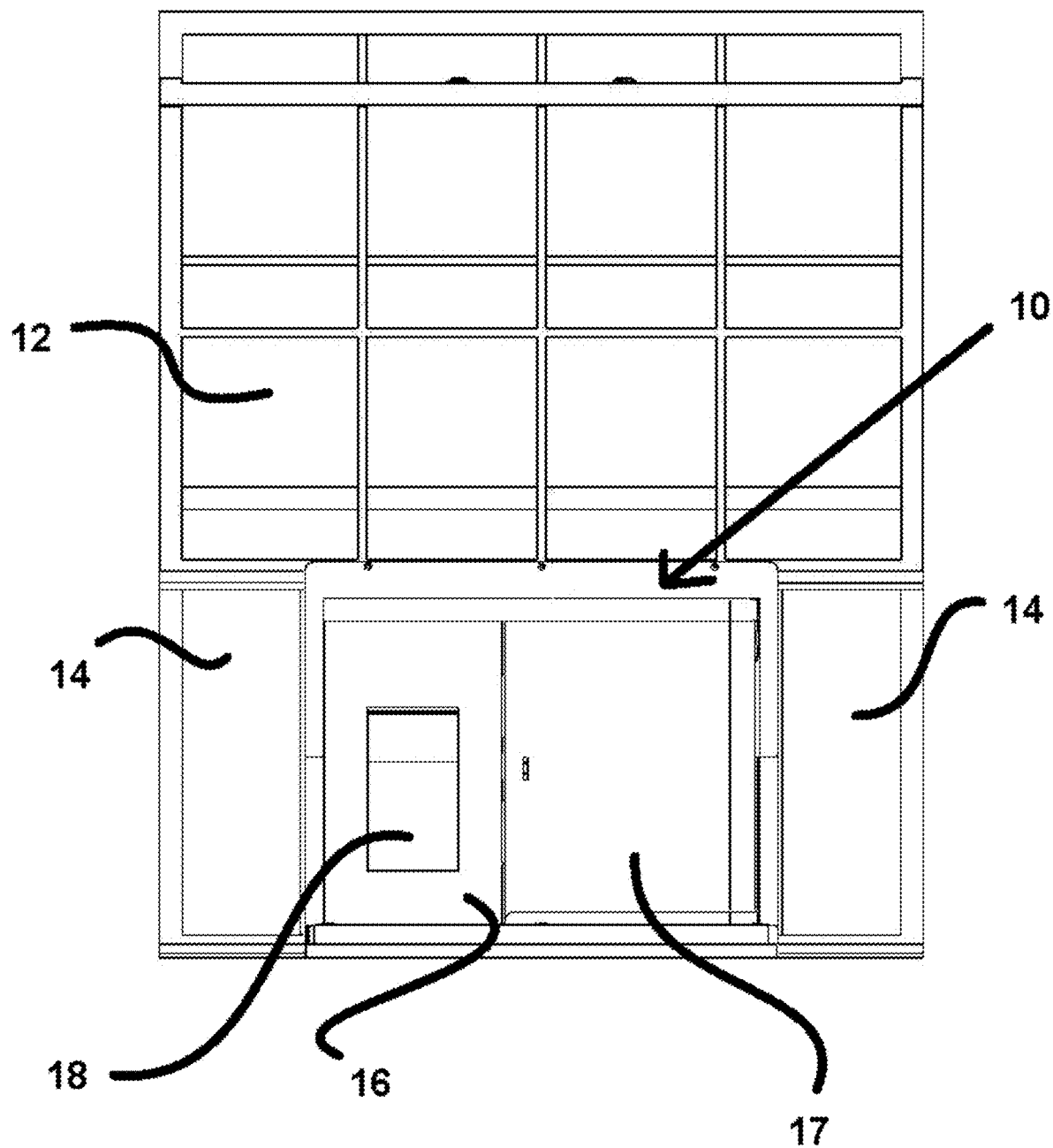
FIG. 8 is a front view of the first embodiment of the present invention disposed in a standard horizontally-oriented window.

FIG. 4 is a straight-on inside view, illustrating how the housing (10) of the first embodiment of the present invention is assembled and installed into a standard sized slider or casement window. The housing (10) itself is similar to a vertical air conditioning window unit, and is inserted the same way. Once placed into a window (12), and secured with the provided screws, the expandable extension panel (14) allows one to close in the gap between the housing and the window frame. A second level floor (40) may be present in embodiments of the present invention designed for a vertically mounted window, as seen in FIG. 3 and FIG. 4. The present invention is also preferably equipped with a landing (26) for the cat to jump onto for easy entry and exit to the housing (10). The landing (26) can also be used as a resting-place or secured scratching post, and is preferably eight inches deep. Access steps (65) may be bundled with the present invention for mounting on an adjacent wall to facilitate access to the housing (10) of the present invention by the pet, as shown in FIG. 6. A ramp (55) may also be bundled with the present invention to facilitate access by pets, as shown in FIG. 5.

Figure 9:
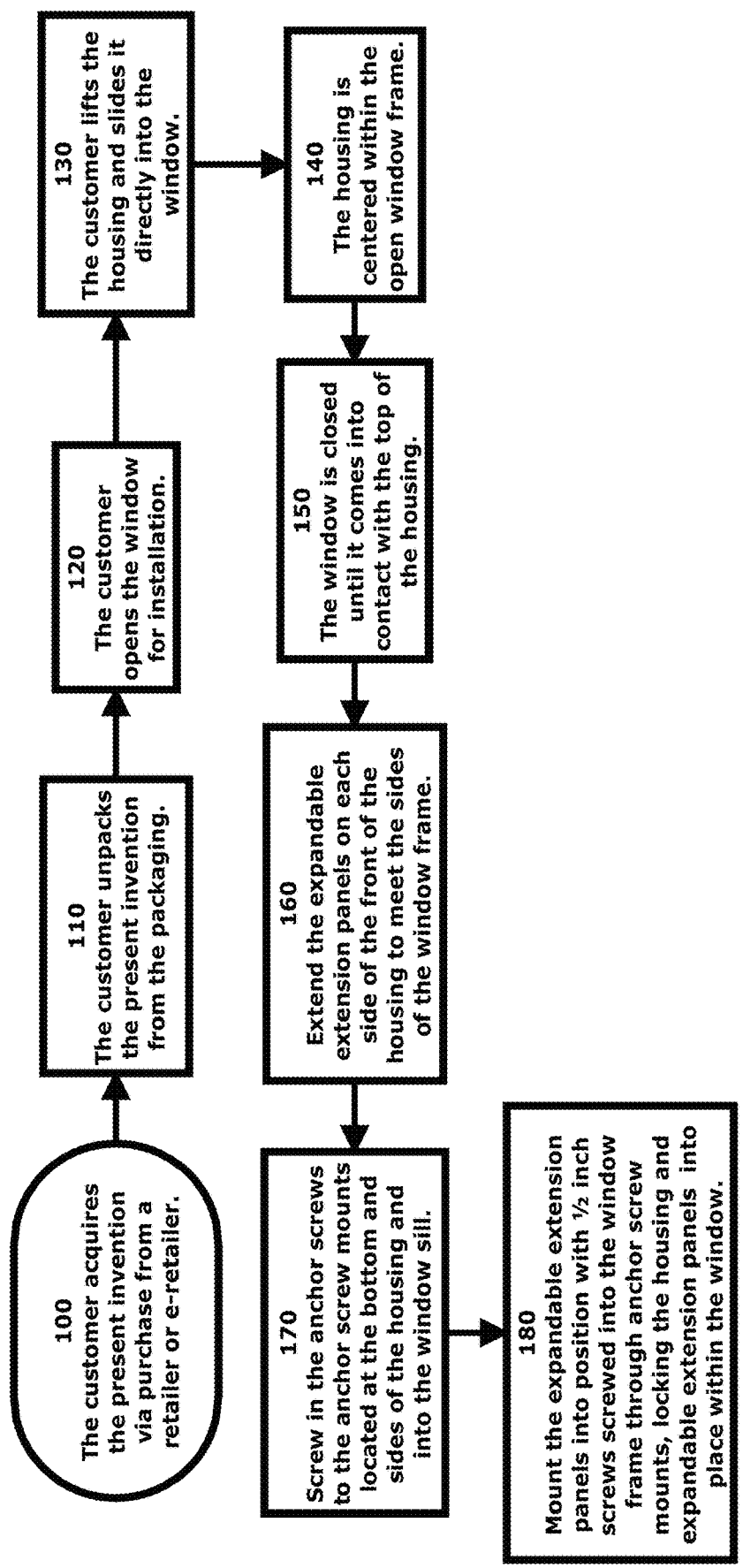
FIG. 9 exhibits a flow chart detailing the process of installation of the first embodiment of the present invention.

Installation of the first embodiment of the present invention preferably requires two people, however it can be accomplished individually. The process of installation and use of the first embodiment of the present invention, as depicted in FIG. 9, is preferably as follows:

1. The customer acquires the present invention via purchase from a retailer or e-retailer. (100)
2. The customer unpacks the present invention from the packaging. (110)
3. The customer opens the window for installation. (120)
4. The customer lifts the housing (10) and slides it directly into the window. (130)
5. The housing (10) is centered within the open window frame. (140)
6. The window is closed until it comes into contact with the top of the housing (10). (150)
7. Extend the expandable extension panels (14) on each side of the front of the housing (10) to meet the sides of the window frame. (160)
8. Screw in the anchor screws to the anchor screw mounts (50) located at the bottom and sides of the housing (10) and into the window sill. (170) Use of a drill is preferred.
9. Mount the expandable extension panels (14) into position with ½ inch screws screwed into the window frame through anchor screw mounts (50), locking the housing (10) and expandable extension panels (14) into place within the window. (180)

The second (preferred) embodiment of the present invention, as shown in FIGS. 10-13 and 15, differs slightly from that of the first embodiment in that the housing (10) is equipped with a front panel (65) which is configured to slide into place within a mounting frame (90) during installation. The Front panel (65) is equipped with an access door (70) and a front hole (80). The front hole (80) is preferably equipped with a flap door which facilitates access to/from the housing (10) for the pet. The access door (70) is to be opened manually by a user when access to the interior of the housing is needed. At least one handle (75) is present on the access door (70) to facilitate opening of the access door (70) when needed for cleaning or changing the litter.

Figure 13:
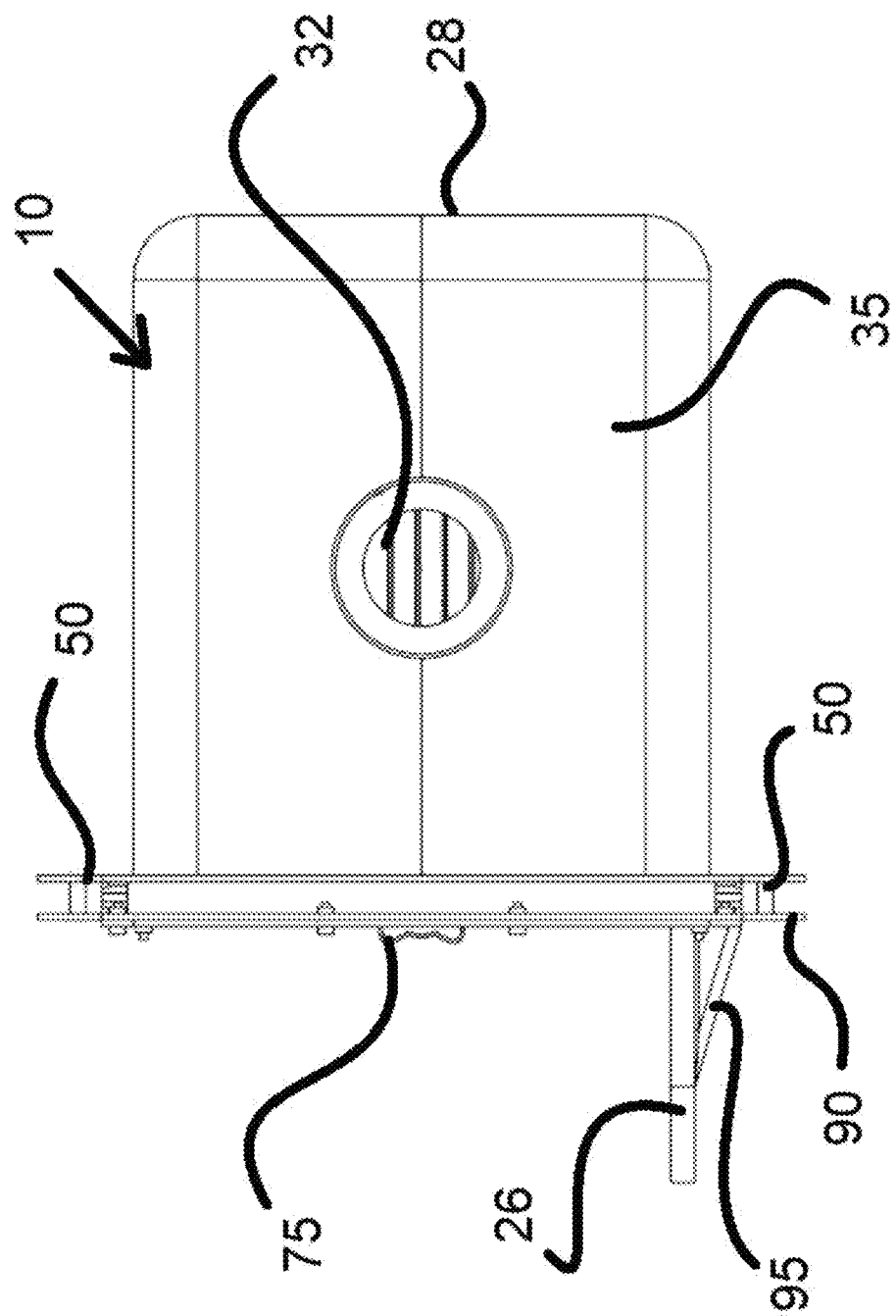
FIG. 13 exhibits a view of the side of the preferred embodiment of the present invention.

Additionally, unlike the first embodiment of the present invention, the preferred embodiment of the present invention is equipped with a landing (26) which preferably has at least one support beam (95) as shown in FIG. 13. The support beam (95) provides additional stability to the landing (26), adding durability to the housing while helping to ensure that the pet does not fear use of the housing due to instability. Also unlike the first embodiment, the preferred embodiment has an extension panel which is composed of slats (56). The slats (56) may be added or removed according to the required size of extension panel needed to fill the gap in the window between the housing and the window frame.

Figure 14:
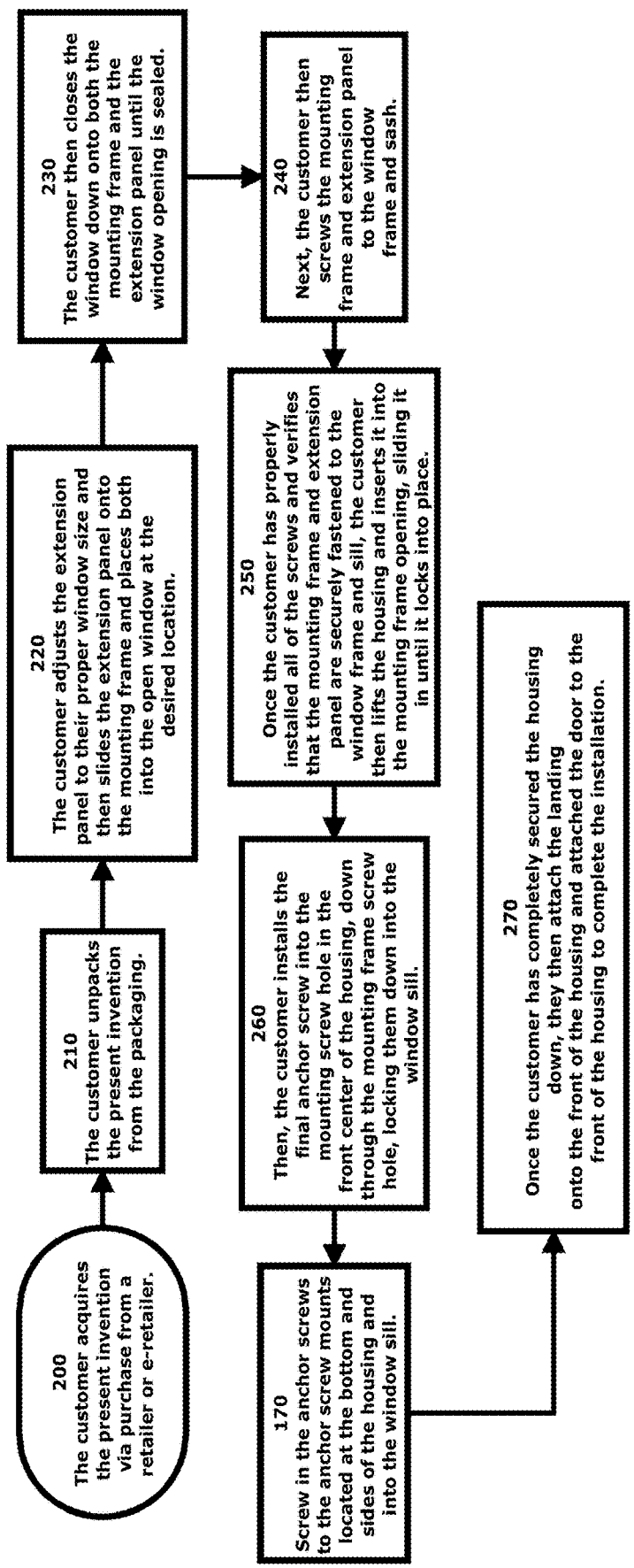
FIG. 14 is a flow chart detailing the process of installation of the preferred embodiment of the present invention.
Figure 15:
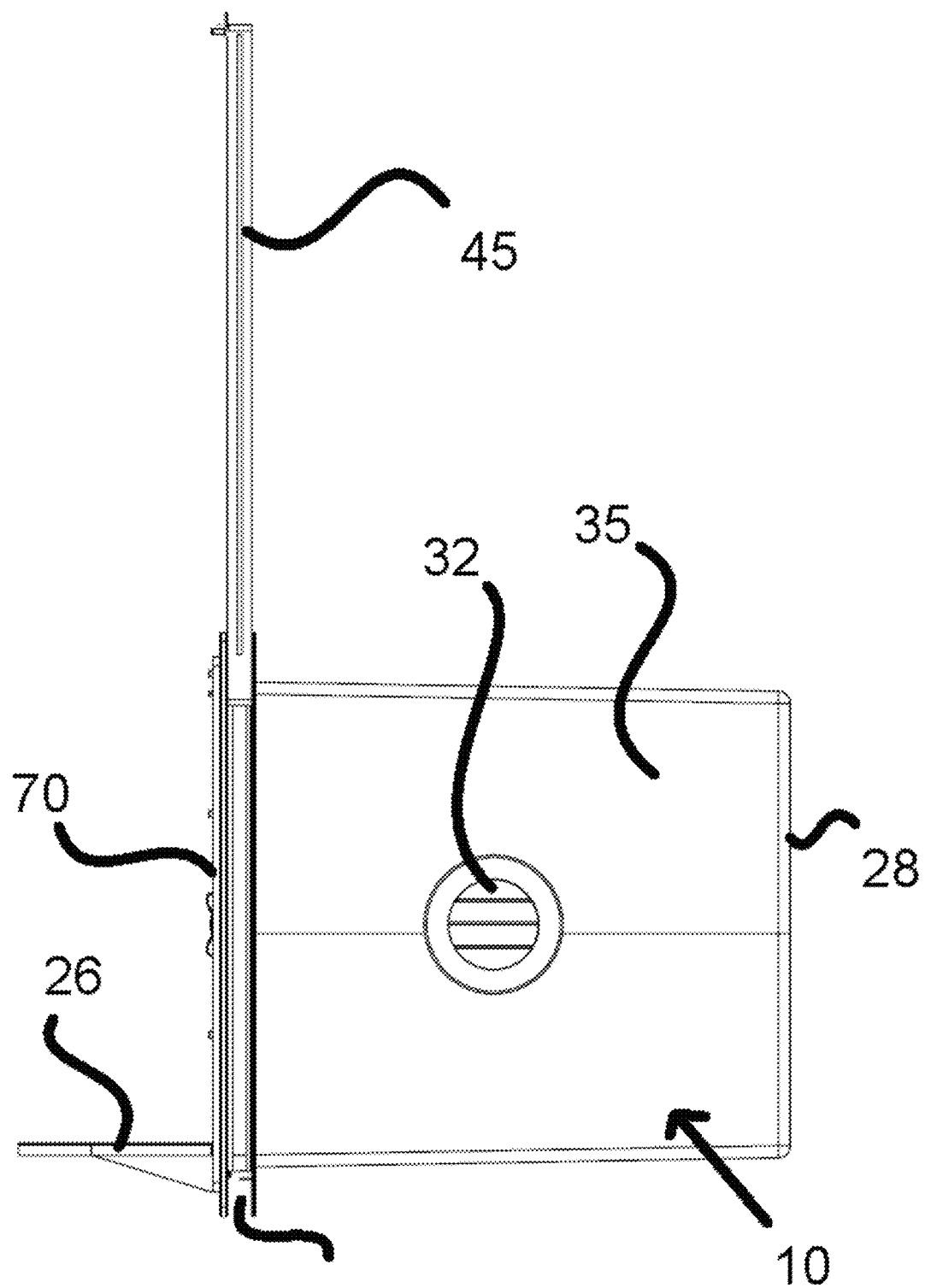
FIG. 15 details a view of the preferred embodiment of the present invention in a vertical orientation as seen from the side.

The method of installation of the second (preferred) embodiment of the present invention differs slightly from that of the first embodiment. The process of installation and use of the first embodiment of the present invention, as depicted in FIG. 14, is preferably as follows:
1. The customer acquires the present invention via purchase from a retailer or e-retailer. (200)
2. The customer unpacks the present invention from the packaging. (210)
3. The customer adjusts the extension panel to their proper window size and then slides the extension panel onto the mounting frame and places both into the open window at the desired location. (220)
4. The customer then closes the window down onto both the mounting frame and the extension panel until the window opening is sealed. (230)
5. Next, the customer then screws the mounting frame and extension panel to the window frame and sash. (240)
6. Once the customer has properly installed all of the screws and verifies that the mounting frame and extension panel are securely fastened to the window frame and sill, the customer then lifts the housing and inserts it into the mounting frame opening, sliding it in until it locks into place. (250)
7. Then, the customer installs the final anchor screw into the mounting screw hole in the front center of the housing, down through the mounting frame screw hole, locking them down into the window sill. (260)
8. Once the customer has completely secured the housing down, they then attach the landing onto the front of the housing and attached the door to the front of the housing to complete the installation. (270)

Alternate embodiments of the present invention include variations on the color, texture, and material composition of the housing (10). Additionally, some alternate embodiments of the present invention are preferably equipped with a ramp (55), which enables the present invention to be used by dogs, ferrets, rabbits, chinchillas, other small pets, as well as elderly or disabled pets who may not be able to jump up to the landing (26) on their own. The ramp (55) is preferably configured to attach to the landing (26) and to extend down below the window to the floor of the dwelling, as shown in FIG. 5. It is envisioned that the ramp (55) may be mounted on either the left side or the right side of the landing (26) or attached at any location along the front of the landing (26). Alternately, stairs may be bundled with the apparatus of the present invention to facilitate access to the housing (10) by the pet.

Figure 10:
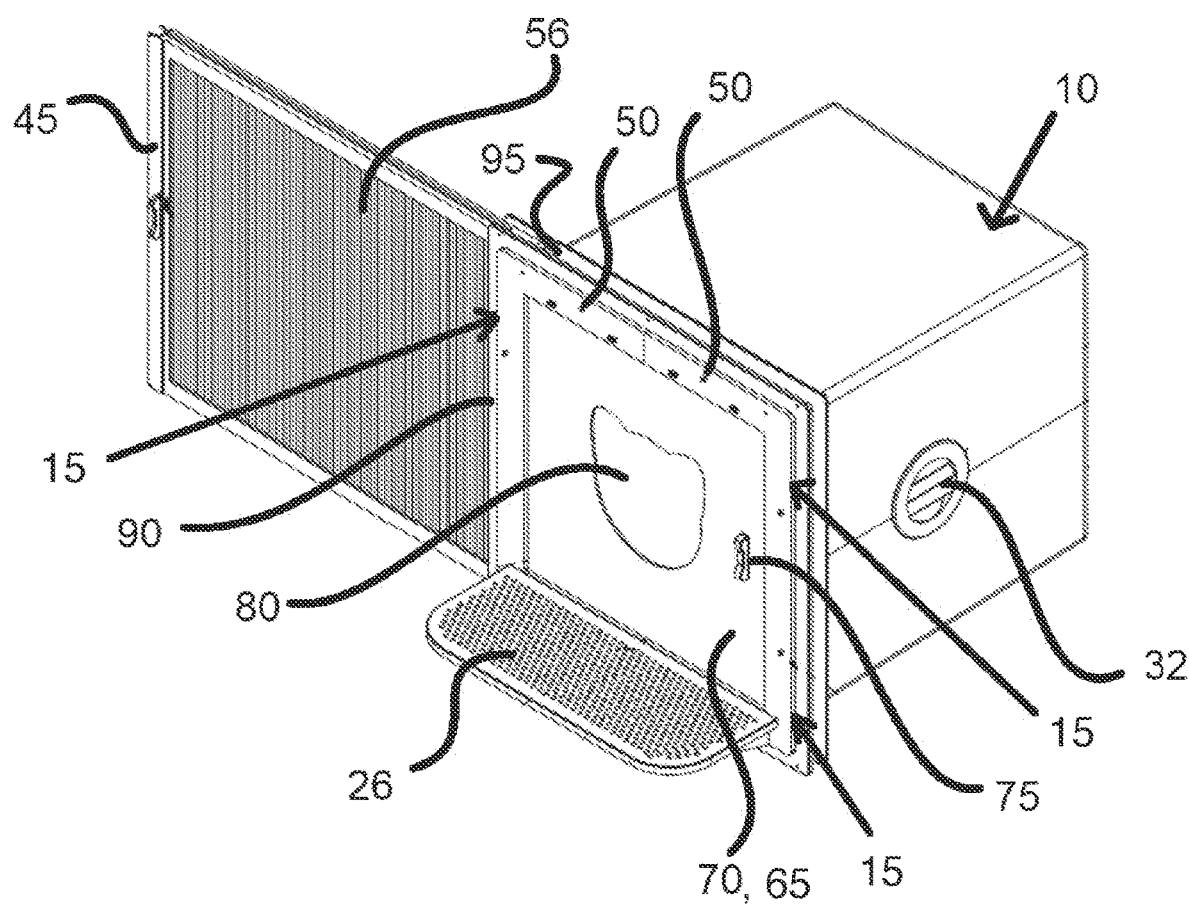
FIG. 10 depicts an isometric view of the second embodiment (primary preferred embodiment) of the present invention as seen from the front and side.
Figure 12:
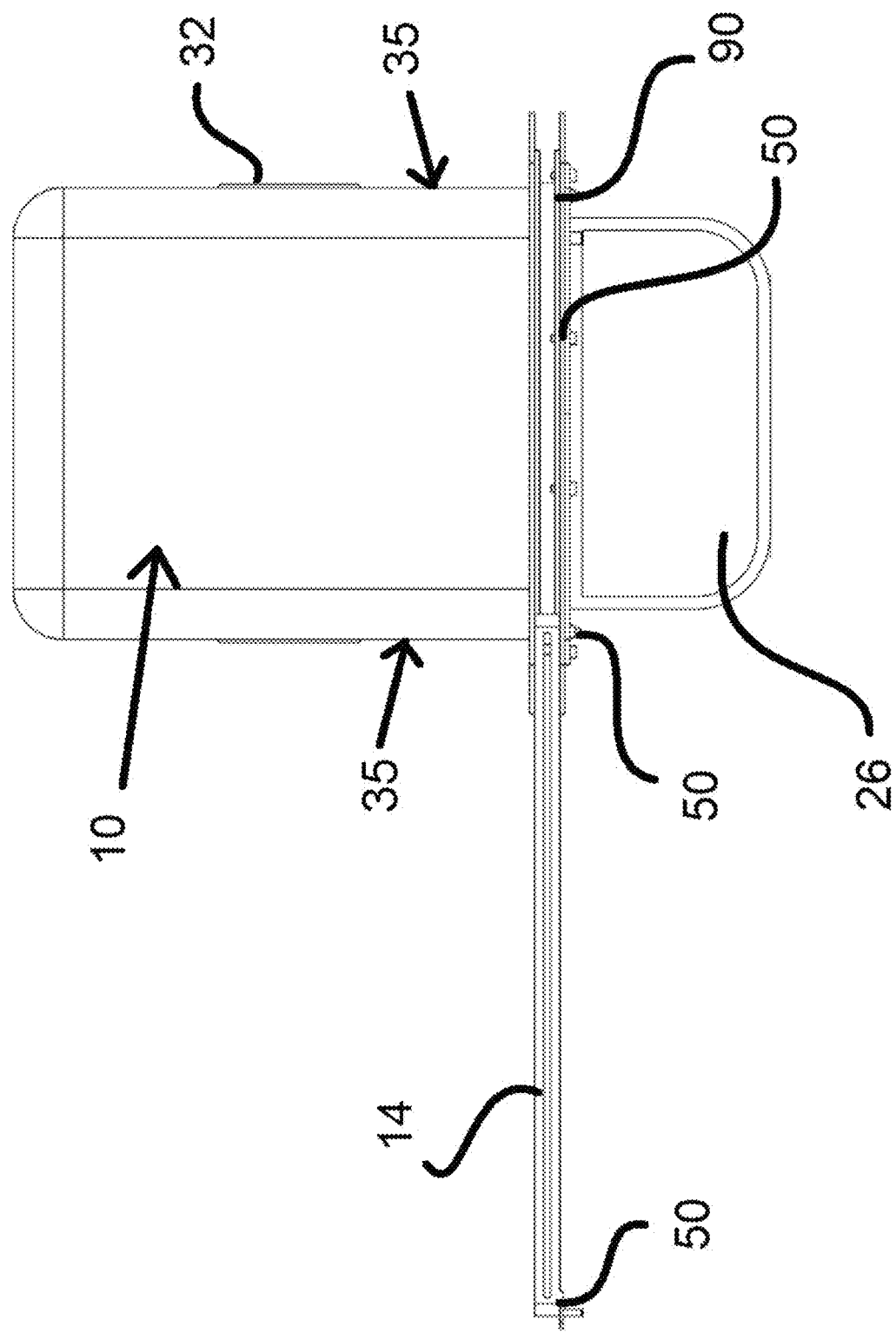
FIG. 12 details a view of the top of the preferred embodiment of the present invention.

As shown in FIG. 10 and FIG. 12, it should be noted that the preferred embodiment of the present invention exhibits a mounting frame (90) which is configured to remain in fixed contact with a window frame of the window. Further, the housing (10) is equipped with a housing flange (15) disposed adjacent to the front side of the mounting frame (90) such that the front side and a back side of the mounting frame is cupped around a window frame when the window is opened as evident in FIG. 12. The housing flange (15) of the housing (10) binds against the housing frame (90) once the housing (10) is slid into the secured mounting frame (90) within the window, providing for ease of installation of the present invention while remaining within the structure of the home, apartment, or similar location equipped with a window. As such, the housing (10) of the present invention is to be mounted to the mounting frame (90) from the inside of the structure. This feature allows for installation of the present invention in high rise apartments as the installer does not go outside of the structure for successful installation of the present invention as previously noted. It should be understood that the housing flange (15) amounts to a lip which extends around and overlaps the mounting frame as shown in FIG. 10. The housing flange (15) overlaps the housing (10) in order to ensure that the housing unit is not allowed to pass through the aperture of the mounting frame (90).

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application. It should be noted that the present invention, including the design of the apparatus, is likely to evolve with updates and variations into the future, as well as manufacturing limitations/parameters allow.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A window-mounted pet litter housing and pet shelter apparatus comprising:
   a housing, said housing equipped with side panels, a sloped roof, a transparent rear panel, a floor, and an open front face with a flange around an entirety of the perimeter of said open face;
   a front door;
   a hinge, said hinge in communication with said housing and said front door;
   wherein said hinge is vertically oriented allowing said front door to open and close;
   wherein when said front door is in a closed position it closes off said open front face of said housing;
   at least one handle, said at least one handle disposed on said front door;
   a flap door, said flap door disposed centrally within said front door;

a landing, said landing disposed below said front door, extending perpendicularly from said flange;

vented louvers, said vented louvers disposed on said side panels;

a mounting frame and an expansion panel, said mounting frame and said expansion panel each equipped with a slot configured to cup a bottom of an opened window and a top of a sill of the window;

wherein said mounting frame is equipped with a gapped segment receiving said expansion panel;

said mounting frame and said expansion panel are fastened to a window frame and sash when installed;

slats, said slats disposed within said expansion frame;

wherein when installed said expansion panel is configured to extend from said mounting frame to close a gap between said housing and said widow frame of said open window;

a central opening in said mounting frame is configured to receive said housing there through, but does not permit said flange to pass through;

wherein said flange is positioned in front of said mounting frame and said side panels, said sloped roof, said transparent rear panel side walls, and said floor are substantially positioned behind the mounting frame when said mounting frame and said housing are installed in said open window frame;

mounting holes, said mounting holes disposed within said flange configured to receive fasteners that secure the housing to the mounting frame.

2. The apparatus of claim 1, wherein said flange overlaps said mounting frame such that, when said housing unit is passed through the housing frame, the housing is prevented from passing completely through the window.

3. The apparatus of claim 1, wherein said mounting frame is first secured into the open window; and wherein said housing unit is subsequently disposed into said mounting frame and affixed to said mounting frame via screws.

4. The apparatus of claim 1, wherein said mounting frame and said housing unit are to be secured within an open window from the interior of a structure.

5. The apparatus of claim 4, wherein said flange overlaps and extends around said mounting frame, preventing said housing unit from traversing through the open window.

* * * * *